United States Patent
Lisin et al.

(10) Patent No.: US 10,240,690 B2
(45) Date of Patent: Mar. 26, 2019

(54) STATIONARY PIPELINE SUPPORT

(71) Applicants: Public Joint Stock Company "Transneft", Moscow (RU); Joint-stock company "Transneft Siberia", Tyumen (RU); L.L.C. "Transneft Research and Development Institute for Oil and Oil Products Transportation", Moscow (RU)

(72) Inventors: Yury Viktorovich Lisin, Moscow (RU); Yurii Borisovich Mikheev, Moscow (RU); Valeriy Vyacheslavovich Bondarenko, Chelyabinsk (RU); Petr Viktorovich Sechkin, Chelyabinsk (RU); Vitaly Ivanovich Surikov, Balashikha (RU); Kirill Sergeevich Shonin, Chelyabinsk (RU); Pavel Ivanovich Shoter, Moscow (RU)

(73) Assignees: PUBLIC JOINT STOCK COMPANY "TRANSNEFT", Moscow (RU); JOINT-STOCK COMPANY "TRANSNEFT SIBERIA", Tyumen (RU); L.L.C. "TRANSNEFT RESEARCH AND DEVELOPMENT INSTITUTE FOR OIL AND OIL PRODUCTS TRANSPORTATION", Moscow (RU)

( * ) Notice: Subject to any disclaimer, the term of this patent is extended or adjusted under 35 U.S.C. 154(b) by 0 days.

(21) Appl. No.: 15/226,896

(22) Filed: Aug. 2, 2016

(65) Prior Publication Data
US 2016/0340860 A1 Nov. 24, 2016

Related U.S. Application Data

(63) Continuation of application No. PCT/RU2014/000217, filed on Mar. 28, 2014.

(51) Int. Cl.
*F16L 1/024* (2006.01)
*F16L 59/21* (2006.01)
(Continued)

(52) U.S. Cl.
CPC ............ *F16L 1/0246* (2013.01); *E02D 27/12* (2013.01); *E02D 27/35* (2013.01); *E02D 27/46* (2013.01);
(Continued)

(58) Field of Classification Search
CPC ... F16L 1/0246; F16L 3/02; F16L 3/04; F16L 1/0243; E02D 27/12; E02D 27/35; E02D 27/46; E02D 31/08; E02D 31/14
(Continued)

(56) References Cited

U.S. PATENT DOCUMENTS

| 492,593 | A | * | 2/1893 | Taylor | F16L 3/10 110/184 |
| 1,470,529 | A | | 10/1923 | Gerber | |

(Continued)

FOREIGN PATENT DOCUMENTS

| CA | 1232255 | 2/1988 |
| CN | 201071981 | 6/2008 |

(Continued)

OTHER PUBLICATIONS

Herbert E. Lindberg; "*Alaska Pipeline in Fairbanks*"; http://lindbergIce.com/alaska/alaska2.htm ; posted Aug. 21, 2000; (7 pages).

(Continued)

*Primary Examiner* — Eret C McNichols
(74) *Attorney, Agent, or Firm* — One LLP; Jonathan Jaech

(57) ABSTRACT

The disclosure relates to a saddle support for use in above-ground pipeline construction in severe geological condi-
(Continued)

tions, such as permafrost. The support provides structural stability and redistribution of a load from a pipeline to a pile foundation. The saddle support includes the spool coupled to four adjustable stands through electric insulating units. The stands can be adjusted to change a height and slope angle of the support and are fastened to a single-level pilework that supported by the pile foundation via flanges. The spool is a pipe having an external case and a heat-insulating layer. Longitudinal ribs are fastened to the spool to fasten the spool to the stands. The load-bearing structure of the spool resists axial and side movements of the pipeline and transfer the load absorbed by the spool to the pilework foundation via the electric insulating units on the adjustable stands.

16 Claims, 3 Drawing Sheets

(51) Int. Cl.

| | | |
|---|---|---|
| *F16L 3/08* | (2006.01) | |
| *E02D 27/12* | (2006.01) | |
| *E02D 27/35* | (2006.01) | |
| *E02D 27/46* | (2006.01) | |
| *E02D 31/08* | (2006.01) | |
| *E02D 31/14* | (2006.01) | |
| *F16L 1/026* | (2006.01) | |
| *F16L 57/00* | (2006.01) | |
| *F16L 3/02* | (2006.01) | |
| *F16L 3/04* | (2006.01) | |

(52) U.S. Cl.
CPC .......... *E02D 31/08* (2013.01); *E02D 31/14* (2013.01); *F16L 1/026* (2013.01); *F16L 3/08* (2013.01); *F16L 57/00* (2013.01); *F16L 59/21* (2013.01); *F16L 3/02* (2013.01); *F16L 3/04* (2013.01)

(58) Field of Classification Search
USPC .......................................... 248/71–73, 74.1
See application file for complete search history.

(56) References Cited

U.S. PATENT DOCUMENTS

| | | | | |
|---|---|---|---|---|
| 1,703,605 | A * | 2/1929 | Ballantyne ............... | F16L 3/18 |
| | | | | 138/106 |
| 1,906,209 | A | 4/1933 | Harding et al. | |
| 2,151,321 | A | 3/1939 | Glover | |
| 2,533,370 | A | 12/1950 | Haug | |
| 2,561,540 | A * | 7/1951 | Sherbrooke ............... | F16L 3/00 |
| | | | | 248/49 |
| 2,846,168 | A * | 8/1958 | Schroeter ............... | A01G 25/00 |
| | | | | 248/139 |
| 3,026,076 | A * | 3/1962 | Bender ................. | F16L 1/0246 |
| | | | | 138/106 |
| 3,168,114 | A | 2/1965 | Martin | |
| 3,298,644 | A | 1/1967 | Sherburne | |
| 3,390,854 | A * | 7/1968 | Sherburne ............... | F16L 3/16 |
| | | | | 14/73.5 |
| 3,863,679 | A * | 2/1975 | Young ..................... | F16L 1/026 |
| | | | | 138/106 |
| 3,963,205 | A | 6/1976 | Hageman | |
| 4,128,219 | A | 12/1978 | Kaigler, Jr. | |
| 4,139,142 | A | 2/1979 | Maple | |
| 4,140,292 | A | 2/1979 | Kaigler, Jr. | |
| 4,244,543 | A | 1/1981 | Ericson | |
| 4,343,497 | A | 8/1982 | Bot | |
| 4,403,759 | A * | 9/1983 | Hicks ...................... | F16L 3/18 |
| | | | | 248/55 |
| 4,445,656 | A * | 5/1984 | Leitch ................... | F16L 3/1058 |
| | | | | 24/23 R |
| 4,530,478 | A * | 7/1985 | McClellan ............ | F16L 59/135 |
| | | | | 138/106 |
| 4,787,583 | A | 11/1988 | Morton | |
| 4,804,158 | A | 2/1989 | Collins et al. | |
| 4,826,113 | A * | 5/1989 | Winters .................... | F16L 3/18 |
| | | | | 248/228.3 |
| 5,028,019 | A | 7/1991 | Hardtke | |
| 5,102,073 | A | 4/1992 | Lestenkof, Jr. | |
| 5,163,642 | A | 11/1992 | Torrens et al. | |
| 5,749,548 | A | 5/1998 | Tamura et al. | |
| 5,924,656 | A | 7/1999 | Okada et al. | |
| 6,206,613 | B1 * | 3/2001 | Elkins ..................... | F16L 3/02 |
| | | | | 248/49 |
| 6,450,736 | B1 | 9/2002 | Eck et al. | |
| 6,502,791 | B2 | 1/2003 | Parker | |
| 7,213,790 | B2 | 5/2007 | Bailey | |
| 7,278,613 | B2 * | 10/2007 | Roy ......................... | F16L 3/02 |
| | | | | 138/106 |
| 7,874,471 | B2 * | 1/2011 | Fairchild ............... | B23K 9/0282 |
| | | | | 228/112.1 |
| 7,950,609 | B2 * | 5/2011 | Pothanikat ............ | F16L 55/035 |
| | | | | 248/55 |
| 8,087,431 | B2 * | 1/2012 | Souza ..................... | F16L 3/02 |
| | | | | 138/103 |
| 2007/0187556 | A1 * | 8/2007 | Yoshitake ............... | F16L 3/02 |
| | | | | 248/58 |
| 2010/0307098 | A1 * | 12/2010 | Yee ......................... | E04C 5/168 |
| | | | | 52/677 |
| 2011/0309207 | A1 | 12/2011 | Senkpiel | |
| 2012/0181396 | A1 | 7/2012 | Simmons et al. | |
| 2013/0048798 | A1 | 2/2013 | Bock | |
| 2013/0115009 | A1 | 5/2013 | Mebarkia | |
| 2014/0021420 | A1 | 1/2014 | Beelen et al. | |
| 2014/0346291 | A1 | 11/2014 | Booth | |
| 2015/0239023 | A1 | 8/2015 | Iwata | |
| 2016/0047496 | A1 * | 2/2016 | O'Connell ............. | F16L 59/16 |
| | | | | 248/72 |
| 2016/0138734 | A1 * | 5/2016 | Keller .................... | F16B 9/026 |
| | | | | 248/49 |
| 2016/0341338 | A1 * | 11/2016 | Sapsay ................... | F16L 3/20 |
| 2017/0030527 | A1 * | 2/2017 | Lisin ...................... | G01S 19/14 |
| 2017/0130872 | A1 * | 5/2017 | Drummond ............. | F16L 3/02 |

FOREIGN PATENT DOCUMENTS

| | | |
|---|---|---|
| CN | 201455598 | 5/2010 |
| CN | 101975312 | 2/2011 |
| CN | 201884790 | 6/2011 |
| CN | 201884792 | 6/2011 |
| CN | 202302330 | 7/2012 |
| CN | 202992525 | 6/2013 |
| CN | 203092062 | 7/2013 |
| CN | 103307364 | 9/2013 |
| CN | 103398234 | 11/2013 |
| CN | 203273194 | 11/2013 |
| CN | 103574173 | 2/2014 |
| CN | 103807570 | 5/2014 |
| CN | 203585572 | 5/2014 |
| CN | 104048104 | 9/2014 |
| CN | 104110527 | 10/2014 |
| CN | 203948785 | 11/2014 |
| CN | 203979646 | 12/2014 |
| CN | 203979658 | 12/2014 |
| CN | 104653871 | 5/2015 |
| CN | 104653875 | 5/2015 |
| CN | 104653952 | 5/2015 |
| CN | 204493888 | 7/2015 |
| CN | 105240623 | 1/2016 |
| DE | 3426968 | 1/1986 |
| DE | 9405929 | 6/1994 |
| EP | 1398552 | 3/2004 |
| GB | 426415 | 4/1935 |
| RU | 2253790 | 6/2005 |
| RU | 64315 | 6/2007 |
| RU | 64316 | 6/2007 |
| RU | 65164 | 7/2007 |
| RU | 65167 | 7/2007 |
| RU | 2335685 | 10/2008 |

(56) References Cited

FOREIGN PATENT DOCUMENTS

| RU | 85974 | 8/2009 |
|---|---|---|
| RU | 99015 | 11/2010 |
| RU | 119057 | 8/2012 |
| RU | 120180 | 9/2012 |
| RU | 124350 | 1/2013 |
| RU | 127853 | 5/2013 |
| RU | 128274 | 5/2013 |
| RU | 2499940 | 10/2013 |
| RU | 2572428 | 9/2015 |
| SU | 556273 | 4/1977 |
| SU | 1099172 | 6/1984 |
| WO | WO2011/145983 | 11/2011 |
| WO | WO2015/147682 | 10/2015 |

OTHER PUBLICATIONS

Piping Technology and Products, Pipe Supports Catalog; *U-Bolt Cradle Support with Guide and Slide Plate (Fig. 800)*; http://web.archive.org/web/20120602203447/http://www.pipingtech.com/products/ptpcat/pipeshoes/nofw/fig800.htm ; Printed Jul. 21, 2016 (1 page).

Piping Technology & Products, The Pipe Supports Blog; *Pipe Anchors*; http://www.pipingtech.com/blog/tag/pipe-anchors/ ; (6 pages).

\* cited by examiner

STATIONARY PIPELINE SUPPORT

CROSS-REFERENCE TO RELATED APPLICATIONS

This application claims the benefit and priority of PCT Pat. App. No. PCT/RU2014/000217, titled STATIONARY PIPELINE SUPPORT and filed on Mar. 28, 2014, also published as WO/2015/147682.

FIELD

The claimed invention relates to the field of above-ground pipeline construction in severe geological conditions and, in particular, to a saddle support installed on a pipeline to form a thermal compensation block that compensates for temperature deformations of the pipeline, saddle supports being positioned at both ends of the thermal compensation block.

BACKGROUND

Saddle supports are installed in pipeline construction to provide absorption of linear extensions of the pipeline due to temperature fluctuations of the transported fluid and the surrounding air, as well as due to pressure fluctuations of the transported fluid. Saddle supports provide for fixation of the pipeline while accounting for increased loads that appear in response to subsidence of neighboring movable supports.

The prior art discloses various types of saddle supports.

U.S. Pat. No. 4,139,142, assigned to Exxon Production Research Company, describes a support saddle structure that is formed by mutually-crossed vertical and horizontal supporting axes. A frame part that forms a foundation of the support is significantly strengthened via the supporting axes, which provides a more stable position in its place.

The structure of this support, according to authors, provides for its stability even during operation in seismic zones. The pipeline is embraced by a wide, assembled yoke and is supported by one vertically-oriented axial element that is tightly fixed in the frame of the foundation. However, subsidence or heaving of the ground under this support may cause deformation of the pile on which the axial element is fixed. This deformation may lead to breakage of the whole support.

The closest analog to the present disclosure is disclosed by RF patent No. 65167 titled "SADDLE SUPPORT" and includes joints fixed between two pairs of stands and a bed and yoke (that embrace the pipe).

The main drawback of this device is that the spool is fixed inside a bed of the internal shell by bolt joints. During operation of the pipeline, axes of bolts are extended under the load, resulting in loosening of nuts (as proved by cyclic tests of this unit with internal pressure and deflection moment). Thus, periodic tightening of bolt joints is required. The support structure does not include quick-detachable panels of a heat insulated support layer to tighten bolt joints if necessary.

The present disclosure is directed to a saddle support structure that prevents linear movement of the pipeline at the beginning and at the end of the compensation block in all directions.

The result of the support of the disclosure is structural stability and redistribution of a load from a pipeline to a pile foundation, as well as decreased risk of negative pile deformation.

SUMMARY

The result is achieved using a saddle support that includes a spool installed through electric insulation units on four stands. The stands are adapted to have their height adjusted to maintain a desired height and slope angle of the support. The stands are installed on a single-level pilework that is supported by a pile foundation. The spool includes a pipe having an external case and a heat-insulating layer, along with an internal shell fixed to its central part. Longitudinal ribs are tightly fastened to the internal shell and are used to fasten the spool to stands. The stands are fixed to the pilework through supporting flanges. The internal shell includes flanges in the form of thickened rings that embrace the internal shell and are fixed to its butts. The surface of the internal shell also contains segmented stiffeners that are tightly attached to the lower part of the shell between longitudinal ribs. The internal shell is made of a single milled sheet installed to embrace the spool, and longitudinal edges of the shell are welded to each other (not to the spool). The shell is welded to the support spool using circular seams.

Non-combustible cellular glass is used as the heat insulation of the spool. The electric insulating units include a holder having a dielectric material.

The pilework may be supported by the pile without joints. To fasten the pilework to the pile, supporting plates are attached to each pile under the pilework and are strengthened by vertical gussets, and pairs of fixtures are tightly fastened to the pilework and to the pile by a welded joint. The supporting plates are tightly fastened to the pilework. The support spool may be installed along the pipeline's axis with a slope relative to the pilework surface. The adjustable stands are tightly fastened to the pilework via flanges and are adapted to provide the precise height and slope angle of the saddle support.

BRIEF DESCRIPTION OF DRAWINGS

The claimed invention is illustrated by the following drawings.

DETAILED DESCRIPTION

Figure 1:
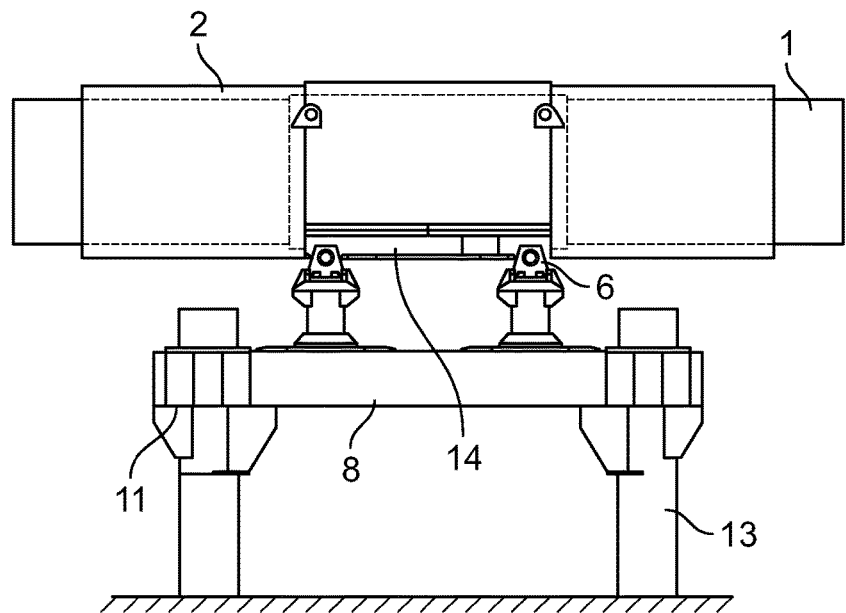
FIG. 1 illustrates a side view of a saddle support.
Figure 2:
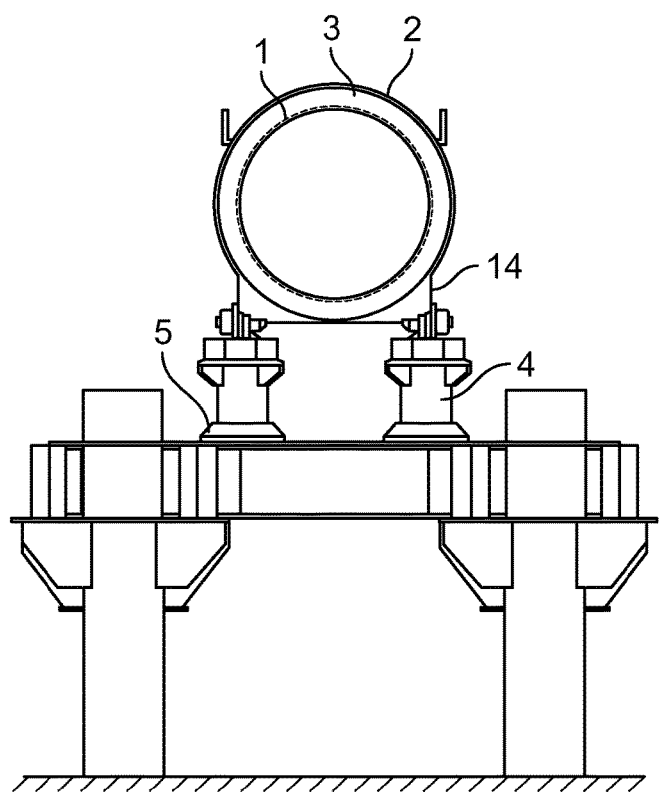
FIG. 2 illustrates a frontal view of a saddle support.
Figure 3:
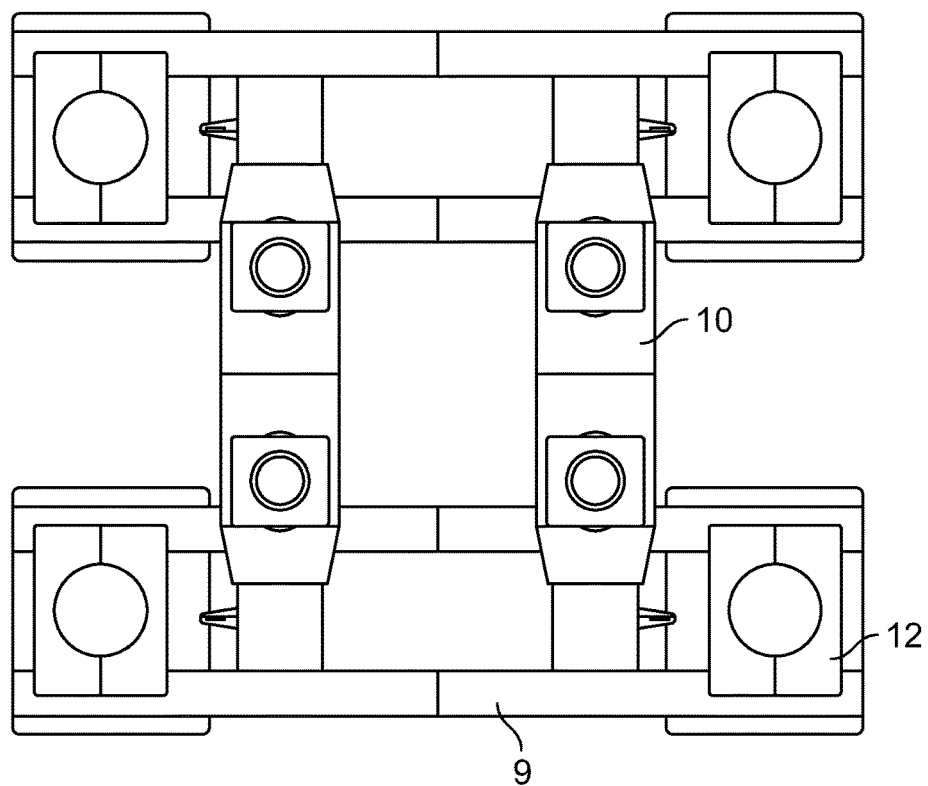
FIG. 3 illustrates a top view of pilework.
Figure 4:
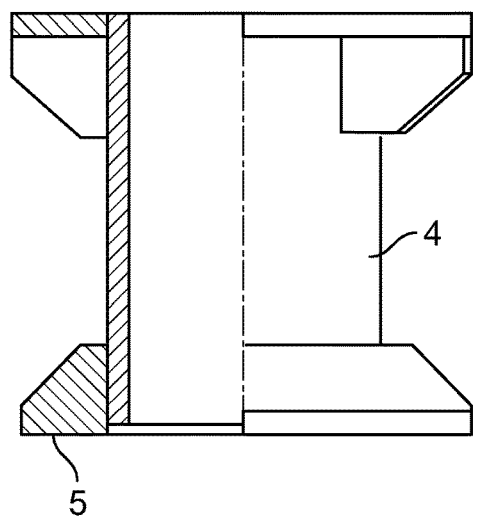
FIG. 4 is an image of an adjustable stand assembled with a flange.
Figure 5:
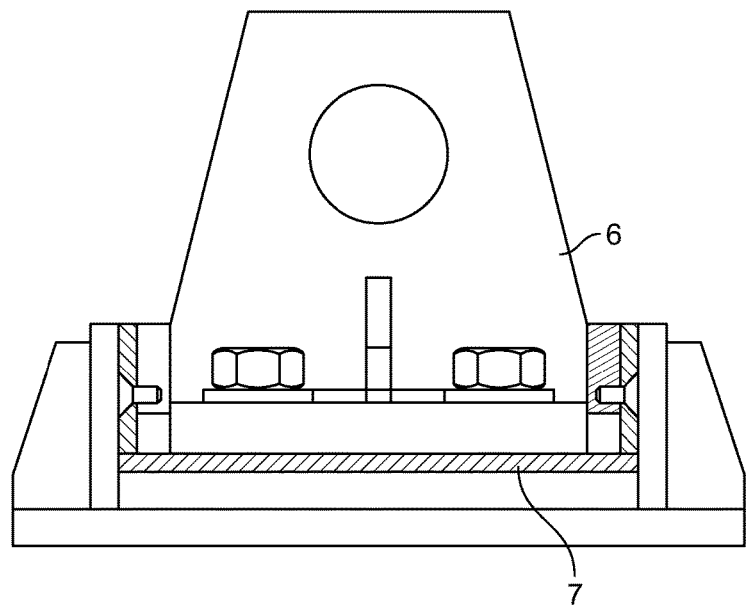
FIG. 5 is an image of an electric insulating unit.
Figure 6:
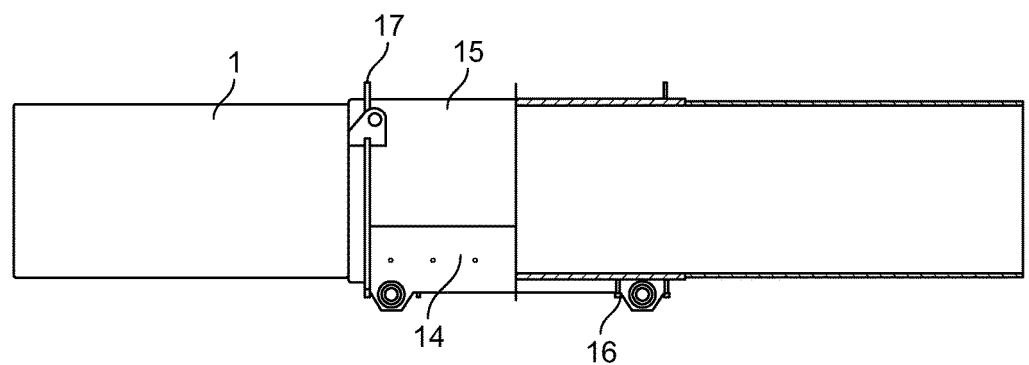
FIG. 6 illustrates a view of a saddle support spool.

The drawings include the following elements, indicated by the corresponding reference numbers:
1. Spool
2. External case
3. Heat insulation
4. Adjustable stand
5. Supporting flange
6. Electric insulating unit
7. Dielectric pads
8. Pilework
9. Longitudinal beams of the pilework
10. Cross beams of the pilework
11. Supporting plate
12. Fixture
13. Pile foundation (not included in the support structure)
14. Longitudinal ribs
15. Internal shell
16. Cross stiffeners (on the internal shell)
17. Flange (on the internal shell).

A saddle support is a stiffly-welded structure that resists relative movement of a pipeline. The support is delivered to the operating site in a preassembled form and is installed on a pilework foundation (that is set to support the support). The support evenly distributes loads from the pipeline to piles of the foundation. The support has external anticorrosive and heat-insulating coatings produced in a factory.

The support includes a spool 1 made of a pipe to be welded to the pipeline. An internal shell 15 is installed around the spool pipe 1 in its central part. This shell 15 is made of a milled sheet pressed around the pipe and welded using a longitudinal seam (not welded to the spool 1). The internal shell 15 is welded to a pipeline by circular seams. Fastening means, such as lugs, are welded to a top part of the internal shell 15. Longitudinal ribs 14 are tightly fastened to the lower part of the shell 15. The ribs 14 include a rectangular metal sheet with holes for installation of the spool fastening means (joints). The longitudinal direction corresponds to the longitudinal direction of the internal shell 15.

Stiffeners—flanges 17—made as thickened metal rings are also stiffly welded near the butts of the shell 15. Additional stiffeners—cross segments 16 (segmented stiffeners)—are also fastened (welded) to the longitudinal ribs 14 under the internal shell 15 along its radius.

After the spool 1 is prepared in such a manner, heat insulation 3 of a non-combustible material, such as cellular glass, is installed. An external case 2 functions as a protective shell and is made of galvanized steel. The external case 2 resists penetration of moisture (water) into the internal cavity of the support and is installed around the heat insulation 3. The longitudinal ribs 14 extend out from the case 2. The spool 1 is coupled to four stands 4 via a hinged bolt joint of the longitudinal ribs 14.

The four stands 4 have electric insulating units 6. Each of the stands 4 has an equal height, and the stands 4 are provided in couples (a couple of stands 4 includes two stands located opposite to each other at sides of the pipeline). The height of a couple of stands 4 is determined based on a desirable position of the support of the pipeline and based on a slope of the environment. According to the desirable position and slope, the stands 4 are adjusted to a particular height during installation of the support on the pipeline. Each stand 4 is equipped with a supporting flange 5, and the height of each stand 4 is set to have a precision of plus or minus 1 millimeter (mm). This facilitates alignment of the axis of the pipeline on neighboring supports as well.

The adjustable stands 4 support the structure and transfer the load from the assembled spool 1 to the pilework 8. After the final adjustment of the height of the stand 4, the flange 5 is welded to the pilework by external and internal circular seams. The top part of the adjustable stands 4 include a foundation made of rolled sheet and gussets that function as stiffeners.

Assembled stands 4 with the flange 5 are installed on the pilework 8. The pilework 8 is a framed structure made of longitudinal beams 9 and cross beams 10 that are positioned to form a single surface. The longitudinal beams 9 of the pilework 8 embrace a pile 13 from both sides. This reduces a deflecting load on the pile 13.

The electric insulating units 6 are installed on the stands 4 and hold a bolt joint for coupling to the longitudinal ribs 14 of the spool 1. The electric insulating units 6 include holders, or pads, made of a dielectric material 7. The bolt joints include dielectric plugs with gaskets. The pilework 8 is installed on the pile foundation 13 through supporting plates 11. The supporting plates 11 are thickened plates having a hole for receiving the pile 13. The supporting plates 11 are positioned on the pile 13 at a desired height, after which the plates 11 are welded to the pile 13. The plates 11 provide separation from the flat supporting surface of the supporting pile 13 of no more than 2 mm. The pilework 8 is then tightly fastened to each supporting plate 11. All of the joints are strengthened by vertically oriented gussets. Two fixtures 12 are installed on the pilework 8 at the junction of the pilework 8 and the pile 13. The fixtures 12 include a thickened plate that embraces the radius of the pile 13. The fixtures 12 are welded to the pile 13 and to the pilework 8. This provides stability and stiffness of the saddle support's structure.

Assembly of the pilework 8 on two surfaces at different levels on the piles 13 provide for a hingeless joint that resists deformation of an underground part of the pile along the radius. The pilework 8 includes an anticorrosive coating, such as a double layered paint and lacquer coating with a zinc-containing primer.

The support operates as follows.

An external diameter and steel grade of the support spool 1 is similar to the portion of the pipe part to which it is connected. Thickness of the spool wall is no less than the thickness of the pipe wall. The support is installed on stands of the pilework 8 along the pipeline route. The stands are cut down to a preset height and fastened to the pilework 8 though supporting flanges. Butts of the spool 1 are welded to the pipeline and the weld site is insulated.

During welding of the support spool 1 to the pipeline, it becomes part of the pipeline. Due to this, the support absorbs all loads from the pipeline. The load-bearing structure of the spool 1 resists axial and side movements of the pipeline and transfer the load received by the spool 1 to the pilework foundation 13 via the adjustable stands 4, the electric insulating units 6, and the pilework 8. The dielectric material is installed in holders, and electrically insulates the pipeline from the pilework 8 of the pile foundation 13.

The invention claimed is:

1. A saddle support comprising:
    a spool configured to be coupled to a pipeline and having an internal shell pressed around and integrated to a section of the pipeline by circular seam welds at each end thereof;
    a heat-insulating layer around the internal shell;
    an external case around the heat-insulating layer;
    a single-level pilework coupled to a pile foundation;
    a pair of at least two adjustable stands each having at least one supporting flange coupled to the single-level pilework and having an adjustable height;
    stiffeners each comprising a longitudinal rib attached to a lower part of the internal shell of the spool and extending out from the external case, each longitudinal rib further attached to and spanning between the at least two adjustable stands of the each pair, thereby fastening the internal shell of the spool to the at least two adjustable stands; and
    electric insulating units positioned between the at least two adjustable stands and the spool and configured to electrically isolate the spool from the pile foundation.

2. The saddle support of claim 1, further comprising metal ring flanges welded around an exterior of the internal shell near butts of the internal shell.

3. The saddle support of claim 1, wherein the internal shell is made of one milled sheet of metal.

4. The saddle support of claim 1, wherein the spool includes additional segmented stiffeners linking the longitudinal ribs.

5. The saddle support of claim 4, wherein the segmented stiffeners are fastened to the longitudinal ribs under the internal shell along its radius.

6. The saddle support of claim 1, wherein the heat-insulating layer of the spool includes non-combustible cellular glass.

7. The saddle support of claim 1, wherein the electric insulating units each include a holder for receiving a bolt coupled to the each longitudinal rib of the spool.

8. The saddle support of claim 1, wherein the electric insulating units include a dielectric pad positioned between the spool and the pair of at least two adjustable stands.

9. The saddle support of claim 1, wherein the single-level pilework is configured to be hingelessly supported by the pile foundation via:
  supporting plates positioned under the single-level pilework, having a hole for receiving the pile foundation, being fastened to the pile foundation, and strengthened by vertical gussets, and
  at least two fixtures each in the form of a thickened plate embracing a pile fastened to the single-level pilework and to the pile foundation via a welded joint.

10. The saddle support of claim 1, further comprising supporting plates fastened to the pile foundation and tightly fastened to the pilework.

11. The saddle support of claim 1, wherein the spool is installed along an axis of the pipeline and set to have a slope that corresponds to a surface of the single-level pilework.

12. The saddle support of claim 1, wherein the pair of at least two adjustable stands are tightly fastened to the single-level pilework via supporting flanges and the adaptable height allows the spool to be set to a desirable height and slope angle during assembly.

13. The saddle support of claim 1, wherein the each longitudinal rib is attached to each of the at least two adjustable stands of the each pair by a hinged bolt joint at each of the stands.

14. The saddle support of claim 1, wherein the external case is positioned around the heat insulating layer and resists penetration of moisture into the spool.

15. The saddle support of claim 1, wherein the external case is made of galvanized steel.

16. The saddle support of claim 1, wherein the each longitudinal rib comprises a rectangular metal sheet having holes along its length for fastening to the spool.

* * * * *